UNITED STATES PATENT OFFICE.

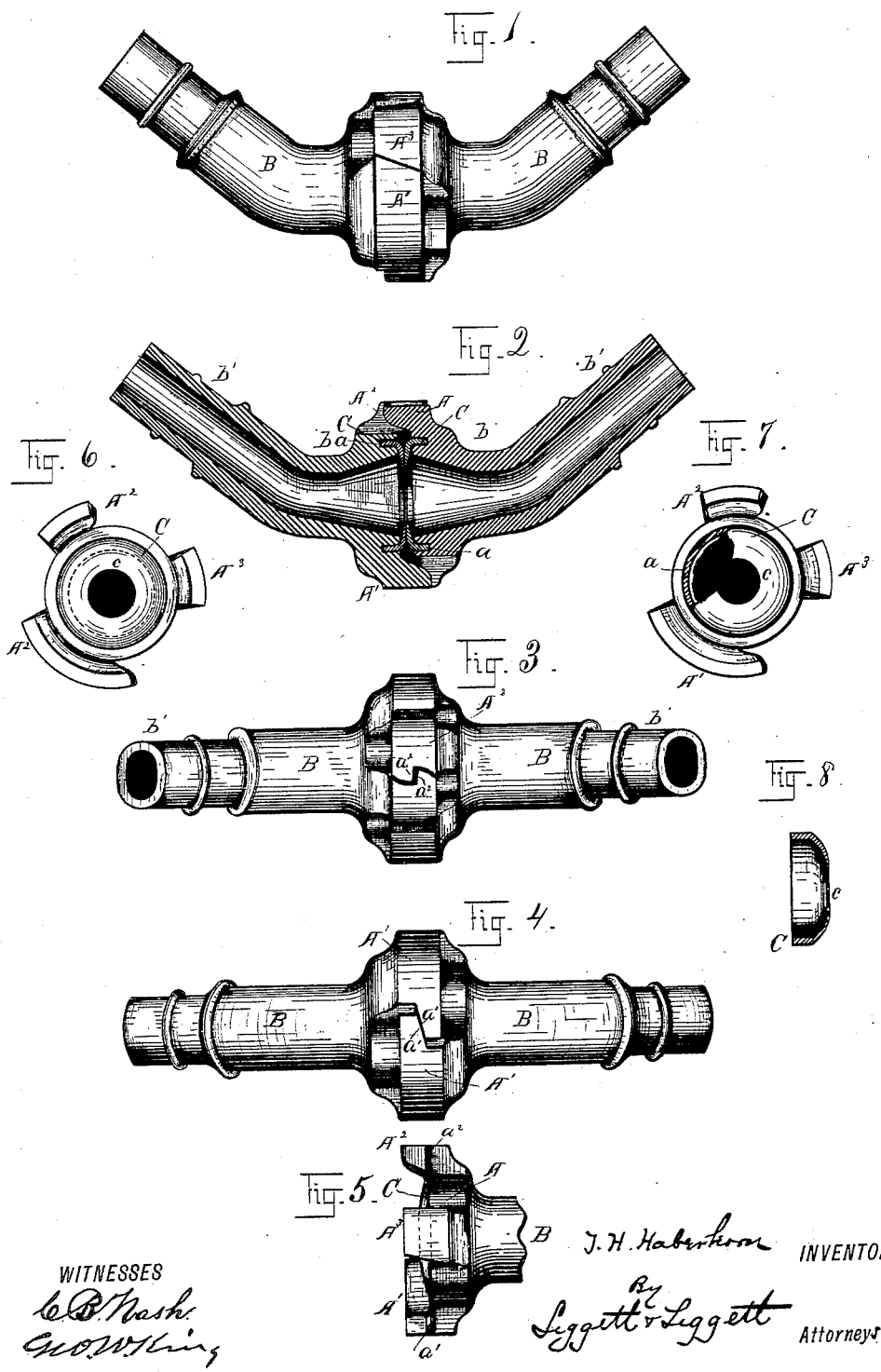

THEODORE H. HABERKORN, OF FORT WAYNE, INDIANA.

PIPE-COUPLING FOR AIR-BRAKES.

SPECIFICATION forming part of Letters Patent No. 398,829, dated March 5, 1889.

Application filed June 21, 1888. Serial No. 277,736. (Model.)

*To all whom it may concern:*

Be it known that I, THEODORE H. HABERKORN, of Fort Wayne, in the county of Allen and State of Indiana, have invented certain new and useful Improvements in Pipe-Couplings for Air-Brakes; and I do hereby declare the following to be a full, clear, and exact description of the invention, such as will enable others skilled in the art to which it pertains to make and use the same.

My invention relates to improvements in pipe-coupling for air-brakes; and it consists in certain features of construction and in combination of parts, hereinafter described, and pointed out in the claims.

In the accompanying drawings, Figure 1 is a side elevation. Fig. 2 is a side elevation in section through the center of the coupling. Figs. 3 and 4 are respectively top and bottom plans. Fig. 5 is a side elevation of the one member of the coupling detached. Figs. 6 and 7 are end elevations of the respective members of the coupling, a portion of the packing-ring being broken away in the latter. Fig. 8 is a side elevation in section through the center of the packing-ring detached.

The two members of the coupling are intended to be alike, but when coupled are in reverse positions, with heads A A facing and engaging each other. The tubular portions B are deflected upward at $b$, as shown, and have reduced end sections, $b'$, adapted to connect, respectively, with flexible tubes, (not shown,) such as are commonly used for such purpose. Each head A on the face thereof is provided with an annular groove, $a$, for securing a packing-ring. Each head has a circumferential segmental external flange divided into three sections, respectively, $A'$, $A^2$, and $A^3$, the intervening spaces between the different sections being adapted to receive loosely the corresponding sections of the opposing member of the coupling. Each flanged section $A'$ at the one end thereof terminates in a lug of considerable length projecting circumferentially, these lugs having faces $a'$ for mutual engagement, such faces being on an incline of perhaps twenty-five degrees (more or less) to a transverse plane of the coupling, these lugs being located at the under side of the coupling. (See Fig. 4.) Flanged sections $A^2$ have short lugs located on the upper side of the coupling, the engaging faces thereof, $a^2$, having only a slight inclination. (See Fig. 3.)

The packing-rings are of soft rubber, with a tubular section, C, adapted to be pressed into groove $a$, and a section, $c$, reduced in diameter and in thickness of material, as shown more clearly in Fig. 8.

In coupling the device the operator grasps section B in either hand, and preferably at or near the connection with the flexible tubes, and first presses the two members of the coupling together on the lower side, lugs $A^3$ meantime serving as guides and interlocking lugs $a'$ and overlapping these lugs, the one on the other their full length, and while lugs $a'$ are retained in such position the upper sides of the two members of the coupling are brought together, the engaging lugs $a'$ meantime serving as fulcrums, and the two lugs $a^2$ pass by each other with the closing of the coupling, after which the two sections of the coupling are turned on their axes in opposite directions to cause lugs $a^2$ to engage or overlap each other, such reverse movements of the two members of the coupling causing lugs $a'$ to move circumferentially in opposite directions; but as these lugs are comparatively long they still overlap each other something more than half their lengths when lugs $a^2$ are interlocked, the position of lugs $a'$ and $a^2$ when the coupling is locked or coupled being shown, respectively, in Figs. 4 and 3.

In closing the coupling the packing is compressed, so as to form a tight joint, and the thin edges $c$ of the packing projecting somewhat into the chamber of the coupling, the air-pressure is applied to both sides of such united thin edges and presses the latter more firmly together, thus preventing a possibility of leakage between the two packing-rings.

The outward pressure on the two members of the coupling caused by the recoil of the packing and by the air-pressure in the pipes would tend to turn the two members of a coupling in the opposite directions, that would more firmly lock lugs $a^2$, owing to the more inclined faces of lugs $a'$, and the coupling therefore remains firmly locked as against any internal pressure. So long as the cars remain coupled there is slack enough in the flexible pipes to prevent any draft on the coupling.

When the cars are uncoupled and move apart, the draft on the coupling, owing to the upward trend of section B, comes entirely on the upper side of the coupling, such draft being sustained entirely by lugs $a^2$, the first result of which is to compress the lower sides of the coupling, so that there will be little or no pressure on lugs $a'$. In fact, these lugs would likely be separated a trifle, after which lugs $a^2$, although their faces have but slight inclination, pull apart, and by so doing of course turn the two members of the coupling in opposite directions to admit of such disengagement of lugs $a^2$, and there being no pressure at the time on lugs $a'$ their inclined faces offer no resistance to such slight rotative movement in opposite directions of the two members of the coupling. The coupling therefore needs no attention in uncoupling the cars, but will automatically draw apart as the cars separate.

After the cars are coupled the coupling of the air-pipes in the manner before explained requires but a moment's time.

What I claim is—

1. In pipe-coupling for air-brakes, the combination, with interlocking lugs connected with the respective members of the coupling and located in pairs, respectively, on the lower and upper sides of the coupling, the lower lugs having longer and more inclined engaging faces than the upper lugs, of tubular sections of the coupling, such tubular sections trending upward from the axis of the coupling, substantially as set forth.

2. In a pipe-coupling, the combination of the two members, each provided with a guiding-lug, $A^3$, and with lugs $A'$, having extended overlapping projections $a'$ $a'$, and with lugs $A^2$, having short overlapping faces $a^2$ $a^2$, substantially as set forth.

In testimony whereof I sign this specification, in the presence of two witnesses, this 26th day of March, 1888.

THEODORE H. HABERKORN.

Witnesses:
R. S. ROBERTSON,
N. A. ROBERTSON.